US007695648B2

(12) United States Patent
Winscom et al.

(10) Patent No.: US 7,695,648 B2
(45) Date of Patent: Apr. 13, 2010

(54) TRANSPARENT CONDUCTIVE SYSTEM

(75) Inventors: Christopher J. Winscom, Histon (GB); Peter Hewitson, Uxbridge (GB); Ian M. Newington, High Wycombe (GB)

(73) Assignee: Eastman Kodak Company, Rochester, NY (US)

( * ) Notice: Subject to any disclaimer, the term of this patent is extended or adjusted under 35 U.S.C. 154(b) by 46 days.

(21) Appl. No.: 12/066,423

(22) PCT Filed: Aug. 3, 2006

(86) PCT No.: PCT/GB2006/002883

§ 371 (c)(1), (2), (4) Date: Mar. 11, 2008

(87) PCT Pub. No.: WO2007/031702

PCT Pub. Date: Mar. 22, 2007

(65) Prior Publication Data

US 2008/0251767 A1 Oct. 16, 2008

(30) Foreign Application Priority Data

Sep. 13, 2005 (GB) ................................ 0518611.9

(51) Int. Cl.
*H01B 1/02* (2006.01)
*H01B 1/12* (2006.01)
*G02B 26/00* (2006.01)

(52) U.S. Cl. .................... 252/512; 252/513; 252/518.1; 252/519.33; 252/299.7; 252/299.01; 252/519.3; 250/515.1; 313/506; 428/457; 428/461; 428/458; 359/238; 359/253

(58) Field of Classification Search ................ 252/513, 252/500, 518.1, 519.3, 519.33, 512, 299.7, 252/299.01; 250/515.1; 313/506; 359/238, 359/253; 428/457, 461, 458
See application file for complete search history.

(56) References Cited

U.S. PATENT DOCUMENTS

| | | | | |
|---|---|---|---|---|
| 3,223,525 | A | 12/1965 | Jonker et al. | |
| 5,354,613 | A | 10/1994 | Quintens et al. | |
| 6,540,939 | B1 * | 4/2003 | Martin et al. | 252/299.01 |
| 6,961,168 | B2 * | 11/2005 | Agrawal et al. | 359/273 |
| 6,963,435 | B2 * | 11/2005 | Mallya et al. | 359/238 |
| 7,404,915 | B2 * | 7/2008 | Goto et al. | 252/500 |
| 7,455,903 | B2 * | 11/2008 | Nakayama et al. | 428/327 |
| 2003/0179986 | A1 | 9/2003 | Martin et al. | |
| 2003/0193709 | A1 * | 10/2003 | Mallya et al. | 359/245 |
| 2004/0149962 | A1 | 8/2004 | Andriessen | |
| 2004/0169158 | A1 * | 9/2004 | Kato et al. | 252/299.2 |
| 2004/0180224 | A1 * | 9/2004 | Thorp et al. | 428/457 |
| 2005/0045851 | A1 * | 3/2005 | He et al. | 252/62.3 R |
| 2005/0122034 | A1 | 6/2005 | Yamashita | |
| 2006/0076051 | A1 * | 4/2006 | Watanabe et al. | 136/263 |
| 2006/0174932 | A1 * | 8/2006 | Usui et al. | 136/252 |
| 2006/0188662 | A1 * | 8/2006 | Farrand et al. | 428/1.1 |
| 2006/0226396 | A1 * | 10/2006 | Majumdar et al. | 252/500 |
| 2007/0215865 | A1 * | 9/2007 | Liu et al. | 257/40 |

FOREIGN PATENT DOCUMENTS

| | | |
|---|---|---|
| GB | 0 585 035 | 1/1947 |
| WO | 2004/019345 | 3/2004 |
| WO | 2004/019666 | 3/2004 |
| WO | 2005/007746 | 1/2005 |

OTHER PUBLICATIONS

Wang P. et al: "Gelation of Ionic Liquid-Based Electrolytes with Silica Nanoparticles for Quasi-Solid-State Dye-Sensitized Solar Cells". Journal of the American Chemical Society, Washington, DC, USA. vol. 125, No. 5, 2003, pp. 1166-1167. XP 001172435. ISSN: 0002-7863.

* cited by examiner

*Primary Examiner*—Douglas Mc Ginty

(57) ABSTRACT

A substantially transparent conductive layer is provided on a support, the layer comprising a conductive ionic liquid and a conductive metal network distributed therein.

14 Claims, 1 Drawing Sheet

TRANSPARENT CONDUCTIVE SYSTEM

FIELD OF THE INVENTION

The invention relates to the field of transparent conductive layers, in particular, but not exclusively, for use in the display element industry.

BACKGROUND OF THE INVENTION

Indium tin oxide (ITO) is commonly used as a transparent conductive layer in display devices, but it has a number of drawbacks. Thick coatings of ITO, which have low surface resistivities, have significantly reduced optical transmission and are not flexible. Bending the coating causes the ITO film to crack so reducing conductivity.

Many applications, such as flat panel displays, require inexpensive transparent conducting layers, but a bus bar is required to transport current over large area displays.

An alternative means of providing a substantially transparent conductor capable of transporting current over large areas is to use a patterned thin metallic conductor, which is also flexible.

One drawback to this approach is that for supplying closely packed devices, e.g. pixel elements of a larger display device, the use of such a common transparent front plane only provides a non-uniform field. This drawback can be improved by the addition of a second layer of a material of lower conductivity, e.g. a conducting polymer.

A common failing of conducting polymers is that they strongly absorb throughout the visible region, thereby damaging optical transmission.

Photographically generated silver conductive tracks are known in the prior art.

GB 0585035 describes a process for making conducting tracks, using a silver image formed by traditional photographic methods which is then put through an electroless-plating process. This may or may not then be followed by an electroplating step to create conductive tracks.

U.S. Pat. No. 3,223,525 describes a process for making conductive tracks using a silver image formed by traditional light exposure methods, in which the silver image is then enhanced by electroless-plating using a physical developer to form conductive tracks.

Silver meshes with continuous conducting polymer layers are also known in the prior art.

U.S. Pat. No. 5,354,613 describes the use of conductive polymers as a transparent conductive thin film, for use as an antistat in photographic products.

WO 2004/019345 and WO 2004/019666 describe the use of a non-continuous metal conductor in conjunction with a continuous conducting polymer layer which is flexible.

US 2004/0149962 describes the use of conductive polymers as transparent conductive layers within a non-uniform conductive metal entity and though this example is more flexible all conductive polymer molecules are significantly coloured compounds, which therefore reduces their optical transmission when coated.

US2005/0122034 describes the use of a layer containing transparent metal oxides in an organic material in conjunction with a layer containing a netlike structure comprising a thin metal line. Metal oxides generally have high refractive indices which as dispersed particles introduce scattering losses.

It is an aim of the invention to improve the electrical field uniformity in a non uniform conductive metal entity without reducing the optical transmission or limiting the flexibility.

SUMMARY OF THE INVENTION

According to the present invention there is provided a substantially transparent conductive layer provided on a support, the layer comprising a conductive ionic liquid and a conductive metal network distributed therein.

ADVANTAGEOUS EFFECT OF THE INVENTION

Elements in accordance with the invention provide good brightness, contrast and uniformity. The elements are also inexpensive to produce. The invention is more flexible than prior art conductive layers using ITO since, unlike ITO, it is not subject to cracking when bent. The ionic liquid can be chosen to be non absorptive throughout the visible wavelength region.

A further advantage of the invention is that it can be formed by a single coating.

BRIEF DESCRIPTION OF THE DRAWINGS

The invention will now be described with reference to the accompanying drawing in which.

DETAILED DESCRIPTION OF THE INVENTION

Figure 1:
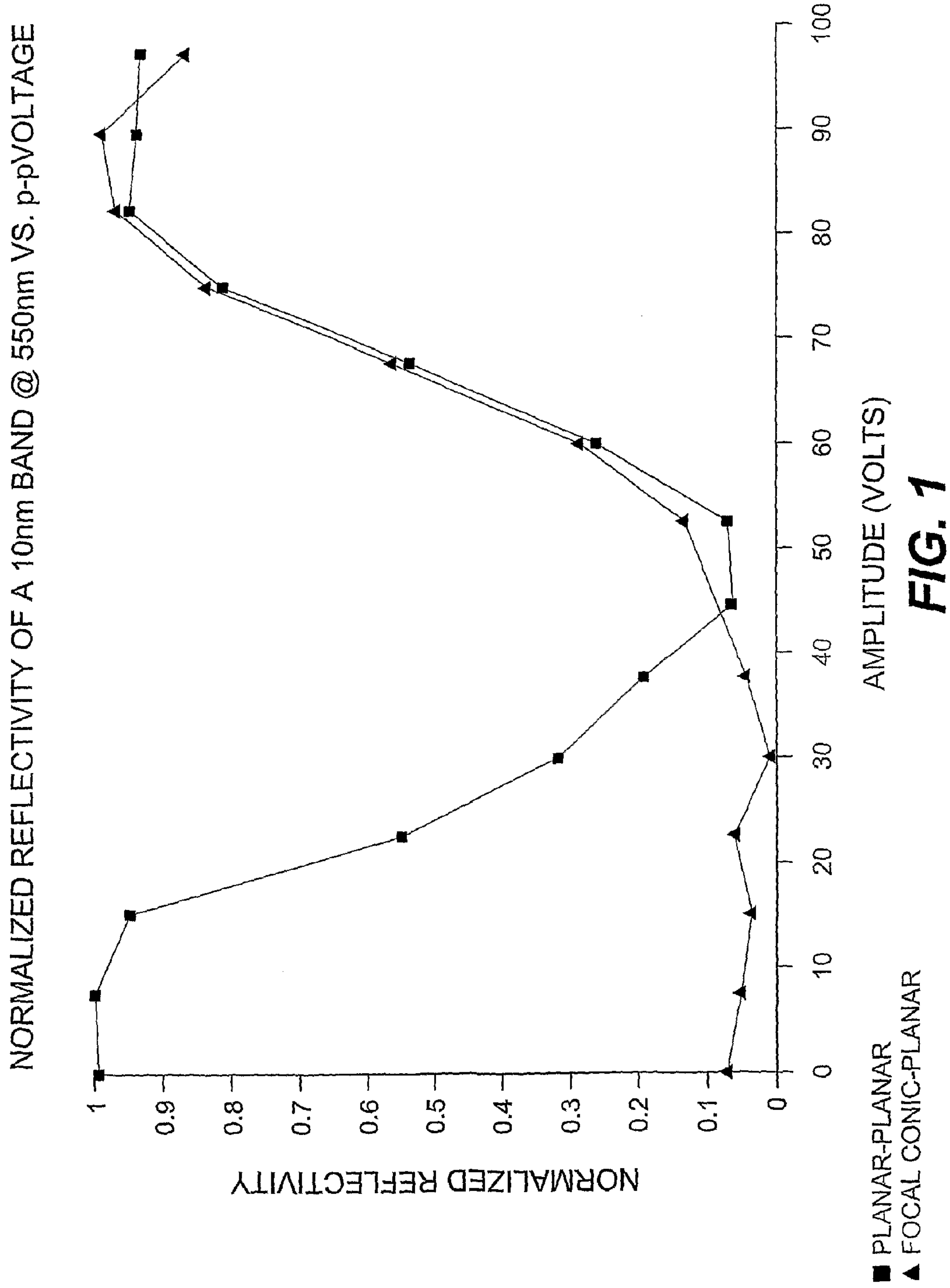
FIG. 1 is a graph showing normalized reflectivity against amplitude with respect to Example 2 described below.

In accordance with the invention non uniform conductive mesh networks are formed by first exposing a silver halide photographic film using laser exposure. The film is then developed, fixed and washed to provide conductive tracks. The tracks may be electrolessly plated or electroplated to improve the conductivity further. However this step is optional and is not essential to the invention. A substantially transparent conductive layer is then added. This layer comprises an ionic liquid. It will be understood that an ionic liquid is a salt which is molten at ambient temperature. The addition of this layer improves the electrical field uniformity.

Ionic liquids have a wide electrochemical window (typically ~3V or more). These liquids conduct by ionic rather than electron transport and are well suited to uses involving AC supply voltages. Therefore their preferred mode of application is for AC devices, e.g.

(1) Cholesteric LCD device.

(2) ACEL display device.

(3) AC-driven, switchable LC window (4) Touch-screen devices.

(5) Electrowetting devices (6) Electromagnetic screening applications

Examples of enabling embodiments follow:

EXAMPLE 1

A coating consisting of: 100 micron substrate of polyethylene terephthalate (PET) coated with an emulsion layer of 0.18 micron chemically sensitized silver chlorobromide (30% bromide) cubes at a silver laydown of 3.6 g/$m^2$ and a gelatin laydown of 1.6 g/$m^2$. This was over coated with a layer of gelatin plus surfactant to give 0.3 g/$m^2$ of gelatin in this layer. There was no hardener added to the coating.

A regular array of tracks was exposed onto the sample using an Orbotech 7008 m laser plotter. The tracks were exposed as a square mesh, each mesh element having a side length of 1000 microns and a track width of 20 microns. This sample was then processed in the following way to produce a relatively transparent conductive film made up of a network of numerous very fine conductive tracks.

| | |
|---|---|
| Developer | 30 s at 21 C. with nitrogen burst agitation |
| Fixer | 45 s at 21 C. with continuous air agitation |
| Wash in running water | 60 s at 15-20 C. with continuous air agitation |
| Dry at room temperature | |

using the following formulae:

| | |
|---|---|
| Developer | |
| Sodium metabisulphite | 24 g |
| Sodium bromide | 4 g |
| Benzotriazole | 0.2 g |
| 1-Phenyl-5-mercaptotetrazole | 0.013 g |
| Hydroquinone (photograde) | 25.0 g |
| 4-Hydroxymethyl-4-methyl-1-phenyl-3-pyrazolidone | 0.8 g |
| Potassium sulphite | 35 g |
| Potassium carbonate | 20 g |
| Water to | 1 liter |
| pH adjusted to 10.4 with 50% potassium hydroxide | |
| Fixer | |
| Ammonium thiosulphate | 200 g |
| Sodium sulphite | 20 g |
| Acetic acid | 10 ml |
| Water to | 1 liter |

The overall sheet resistivity of this mesh sample was measured and found to be 635 ohms/square and the mesh area had an optical transmission of 96.6%, excluding the base and background photographic fog. The sample was then overcoated with a layer of ionic liquid using an automated bar-coating station, using a 24 micron-coating bar. This layer is retained in place by gelation, using, for example, silica. The size of the silica particles should be less than 100 nm. In a preferred embodiment the particles would be less than 50 nm. Even more preferentially the particles would be less than 20 nm.

The coating solution contained:

| | |
|---|---|
| 3-butyl-1-methylimidazolium tetrafluoroborate | 5 g |
| Water | 5 g |
| Silica | 0.25 g |
| Surfactant Olin 10G (10%) in water | 0.1 g |

The mixture was sonicated to give a unifommly homogeneous solution.

Other suitable ionic liquids are, e.g. $C^+ A^-$ where $C^+$ is an organic cation and $A^-$ is an anion such that the combination produces a salt which is liquid at the working temperature of the device, preferably at ambient conditions. Such ionic liquids are commonly referred to as room temperature ionic liquids.

Examples of suitable cations are:

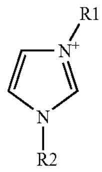

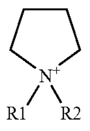

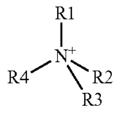

-continued

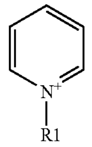

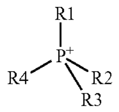

where R1-R4 are the same or different and are selected from: hydrogen, alkyl, alkenyl, aralkyl, alkylaryl, fluoroalkyl, fluoroalkenyl or fluoroaralkyl or fluoroalkylaryl.

It will be understood by those skilled in the art that these are examples only and that the invention is not limited to these.

Examples of suitable anions include:

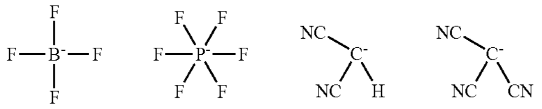

$Cl^-$ $CF_3CO_2$— $CF_3CO_2$— $(CF_3SO_2)_2N$— $CH_3SO_4$—

Again, it will be understood by those skilled in the art that these are examples only and that the invention is not limited to these.

The water was allowed to evaporate from the coating at room temperature to leave a silica ionic liquid gel on the surface of the conductive mesh network. The sample now had an optical transmission of 95.1%, excluding the base and background photographic fog.

This sample was laminated to a sheet containing a homogenized coating of cholesteric liquid crystal in a polymeric binder, such as deionised gelatin or polyvinylalcohol (PVA), which had itself been coated onto a transparent electrically conductive coating formed from tin oxide or preferably indium tin oxide (ITO) sputtered onto a 100 micron substrate of polyethylene terephthalate (PET) giving a surface resistance of less than 300 ohms/square.

An alternating field is applied between the electrically conducting mesh network and the ITO layer to allow the liquid crystal to be switched between its reflective (planar) and transparent (focal conic) states.

EXAMPLE 2

A coating consisting of: 100 micron substrate of polyethylene terephthalate (PET) coated with an emulsion layer of 0.18 micron chemically sensitized silver chlorobromide (30% bromide) cubes at a silver laydown of 3.6 $g/m^2$ and a gelatin laydown of 1.6 $g/m^2$. This was over coated with a layer of gelatin plus surfactant, Olin 10G, to give 0.3 $g/m^2$ of gelatin in this layer. There was no hardener added to the coating.

A regular array of tracks was exposed onto the sample using an Orbotech 7008 m laser plotter. The tracks were exposed as a square mesh, each mesh element having a side length of 500 microns and a track width of 20 microns. This sample was then photographically processed in the following way to produce a relatively transparent conductive film made up of a network of numerous very fine conductive tracks.

The film was developed in a tanning developer which consisted of

| | | |
|---|---|---|
| Solution A | | |
| Pyrogallol | 10 | g |
| Sodium sulphite | 0.5 | g |
| Potassium Bromide | 0.5 | g |
| Water to | 500 | ml |
| Solution B | | |
| Potassium Carbonate | 50 | g |
| Water to | 500 | ml |

Just prior to use A and B were mixed in a 1:1 ratio (ie 100 ml+100 ml).

Development was for about 7 minutes at room temperature (21° C.). The oxidation products from the development harden the gelatin in the exposed areas.

The film was then given a 'hot fix'. The film was immersed in Kodak RA 3000 fix solution at 40° C. for 10 minutes. The gelatin in the unexposed region becomes soft and either melts, dissolves or simply delaminates leaving only the exposed silver as a relief image. Prior art had suggested that the film should be washed with cold water and then warm water to strip the unwanted gelatin away. The 'hot fix' is not only more efficient but also rids the photographic image of a few residual undeveloped silver halide grains. These grains will become silver in the subsequent plating bath and limit the resolution of the final track.

To ensure that all unwanted gelatin is removed the relief image can be given a wash with a dilute enzyme bath. The enzyme bath is prepared by taking 6.3 g of Takamine powder dissolved in 1.31 of demineralised water. After 1 hour of stirring the material is filtered through a 3.0 μm filter, then through a 0.45 μm filter. The final bath is made up of 3 ml of concentrate diluted to 600 g with demineralised water. The enzymolysis tales about 1 minute at room temperature.

The film was then rinsed in cold water for 5 minutes, then dried.

The conductivity of the tracks was further enhanced by electrolessly plating the tracks with silver using the following process.

The film was immersed in a plating bath at room temperature for 10 minutes. The composition of the bath was:

| | | |
|---|---|---|
| ferric nitrate nonahydrate | 20 | g |
| citric acid | 10.5 | g |
| water to | 250 | g |
| warm to >25 C. | 39.2 | g |
| ammonium ferrous sulfate•$12H_2O$ | | |
| water to | 367.5 | g |
| DDA** 10% | 2.5 | g |
| Lissapol 1 ml in 100 ml | 2.5 | g |
| Part B | | |
| silver nitrate | 5 | g |
| water to | 125 | g |
| These were mixed just prior to use | | |

**DDA 10%

| | |
|---|---|
| water 10% | 90 ml |
| dodecylamine | 7.5 g |
| acetic acid glacial | 2.5 g |

The overall sheet resistivity of this mesh sample was measured and found to be 2.8 ohms/square and the mesh area had an optical transmission of 80.5%, excluding the base and background photographic fog. The sample was then overcoated with a layer of ionic liquid using an automated wringer roller coating station, with a 24 micron-coating bar, using the formulation given in Example 1.

The water was allowed to evaporate from the coating at room temperature to leave a silica ionic liquid gel on the surface of the conductive mesh. The sample now had an optical transmission of 79.3%, excluding the base and background photographic fog.

This sample was laminated to a sheet containing a homogenized coating of cholesteric liquid crystal in a polymeric binder, such as deionised gelatin or polyvinylalcohol (PVA), which had itself been coated onto a transparent electrically conductive coating formed from tin oxide or preferably indium tin oxide (ITO) sputtered onto a 100 micron substrate of polyethylene terephthalate (PET) giving a surface resistance of less than 300 ohms/square.

An alternating field is applied between the electrically conducting mesh and the ITO layer to allow the liquid crystal to be switched between its reflective and transparent states.

The sample was also switched with a set of voltage pulse trains to generate varying levels of reflectivity. The graph in FIG. 1 shows the sample being switched from its most reflective state to the transparent state and back to the reflective state. The graph also shows the transition from the transparent state to the reflective state.

The invention can be used in any process in which a transparent electrode with a uniform electric field is required. These could be, for example, AC Solid State Lighting devices and other AC display devices and electromagnetic shielding applications.

The invention has been described in detail with reference to preferred embodiments thereof. It will be understood by those skilled in the art that variations and modifications can be effected within the scope of the invention.

The invention claimed is:

1. A substantially transparent conductive layer provided on a support, the layer comprising a conductive ionic liquid and a conductive metal mesh network, the conductive ionic liquid being coated on the surface of the conductive metal mesh network.

2. A conductive layer as claimed in claim 1 wherein the refractive index of the liquid matches the refractive index of the support.

3. A conductive layer as claimed in claim 1 wherein the support is a polyethylene terephthalate support.

4. A conductive layer as claimed in claim 1 wherein the ionic liquid is retained in place by a gelating agent.

5. A conductive layer as claimed in claim 4 wherein the gelating agent comprising particles having a dimension of less than 100 nm.

6. A conductive layer as claimed in claim 5 wherein the particles have a dimension of less than 50 nm.

7. A conductive layer as claimed in claim 6 wherein the particles have a dimension of less than 20 nm.

8. A device incorporating a substantially transparent conductive layer as claimed in claim 1.

9. An AC driven device incorporating a substantially transparent conductive layer as claimed in claim 1.

10. A device according to claim 8, which device is selected from a solid state lighting device, an AC display device or an electromagnetic shielding device.

11. A device according to claim 8, which device is selected from any one of a cholesteric LCD device, ACEL display devices, an AC-driven switchable AC window device, a touch screen device, or an electrowetting device.

12. A liquid crystal device switchable between reflective and transparent states, said device comprising a first transparent electrically conductive coating having coated thereon a homogenised coating of cholesteric liquid crystal in a polymeric binder and laminated thereon a second transparent electrically conductive coating, at least one of said first and second transparent electrically conductive coatings comprises a substantially transparent conductive layer as defined in claim 1.

13. A conductive layer as claimed in claim 1, wherein the conductive metal mesh network is formed of metal conductive tracks.

14. A conductive layer as claimed in claim 1, wherein the conductive metal mesh network formed on the support has an optical transmission of at least 80%.

* * * * *